United States Patent [19]
Karpati

[11] Patent Number: 5,132,527
[45] Date of Patent: Jul. 21, 1992

[54] COMPENSATION ARRANGEMENT FOR OPTO-ELECTRONIC REFERENCE GENERATOR

[75] Inventor: Anthony J. Karpati, Clifton, N.J.

[73] Assignee: GEC-Marconi Electronic Systems Corp., Wayne, N.J.

[21] Appl. No.: 710,373

[22] Filed: May 30, 1991

[51] Int. Cl.$^5$ ................................................ G01J 1/32
[52] U.S. Cl. ............................... 250/205; 250/231.13; 250/231.14
[58] Field of Search ...................... 250/231.13, 231.14, 250/231.16, 205, 214 R, 214 C

[56] References Cited

U.S. PATENT DOCUMENTS

| | | |
|---|---|---|
| 4,074,128 | 2/1978 | Harris, Jr. et al. ............. 250/231.16 |
| 4,203,032 | 5/1980 | Haunstetter et al. ................ 250/205 |
| 5,043,565 | 8/1991 | Gleim ................................... 250/205 |

Primary Examiner—David C. Nelms
Assistant Examiner—Que T. Le
Attorney, Agent, or Firm—David L. Davis

[57] ABSTRACT

A compensation arrangement for an opto-electronic reference generator includes circuitry for comparing the output level from a light detector to a reference voltage and circuitry for utilizing the results of the comparison to control the drive voltage across a light emitter.

6 Claims, 3 Drawing Sheets

COMPENSATION ARRANGEMENT FOR OPTO-ELECTRONIC REFERENCE GENERATOR

BACKGROUND OF THE INVENTION

This invention relates to opto-electronic reference generators and, more particularly, to an arrangement for providing a constant level output signal therefrom.

As described in U.S. Pat. No. 4,621,529, guidance systems for modern aircraft require rate and acceleration sensing. This may be achieved by utilizing a gyroscopic multi-sensor assembly which operates by sensing an angular velocity about some axis perpendicular to the spin bearing axis of the device with the use of a gyroscopic element. The gyroscopic element is mechanically restrained by a piezoelectric crystal beam so that gyroscopic reaction to angular velocity mechanically strains the piezoelectric crystal beam which in turn produces an electrical output signal proportional to angular velocity input. Similarly, a restrained piezoelectric crystal beam can be employed to sense linear acceleration along any axis perpendicular to the spin bearing axis. Thus, through the use of one or more mechanically restrained piezoelectric crystal beams, both the angular velocity and acceleration amplitude may be converted into electrical signals.

The spin bearing axis discussed above is defined by the rotational axis of the output shaft of a motor, upon which output shaft the gyroscopic element is mounted. In order to provide a reference signal which is required for timing purposes, a reference signal generator is also coupled to the motor output shaft. Such a reference signal generator may illustratively include a disk mounted for rotation on the output shaft, which disk is diametrically divided into a first region which is light transmissive and a second region which is opaque. The disk is then straddled by an optical sensing unit which includes a light emitting diode on one side of the disk and a phototransistor on the other side of the disk. Ideally, this sensor provides a square wave output.

While the aforedescribed arrangement operates generally satisfactorily, it will be appreciated that when mounted in an aircraft, the multi-sensor assembly is subjected to varying temperatures. Since the outputs of the light emitting diode and the phototransistor vary with temperature, such temperature variation results in a variation in the amplitude of the square wave output. In the particular system with which the present invention is concerned, the output of the phototransistor is provided as the input to a comparator circuit. There is a significant rise time at the output of the photo-transistor so that if the amplitude of the output varies, the relative triggering time of the comparator circuit will likewise vary. This is an undesirable condition.

It is therefore a primary object of the present invention to provide an arrangement wherein the amplitude of the phototransistor output signal is maintained at a substantially constant level independent of temperature.

SUMMARY OF THE INVENTION

The foregoing, and additional, objects are attained in accordance with the principles of this invention by comparing the output of the phototransistor with a reference voltage and controlling the drive voltage across the light emitting diode to maintain the phototransistor output substantially at the reference voltage level.

In accordance with an aspect of this invention, sample and hold means are utilized to insure that the phototransistor output comparison only takes place during the time that the light transmissive area of the disk is between the light emitting diode and the photo-transistor.

BRIEF DESCRIPTION OF THE DRAWING

The foregoing will be more readily apparent upon reading the following description in conjunction with the drawings in which like elements in different figures thereof have the same reference numeral and wherein.

DETAILED DESCRIPTION

Figure 1:
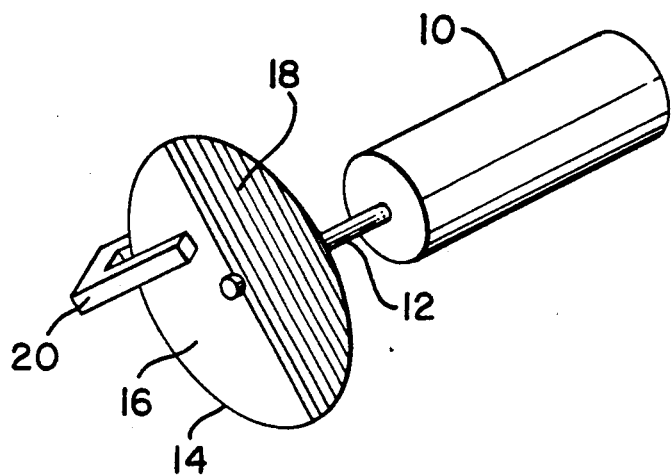
FIG. 1 is a perspective view schematically illustrating the reference generator assembly with which the present invention is concerned.
Figure 2:
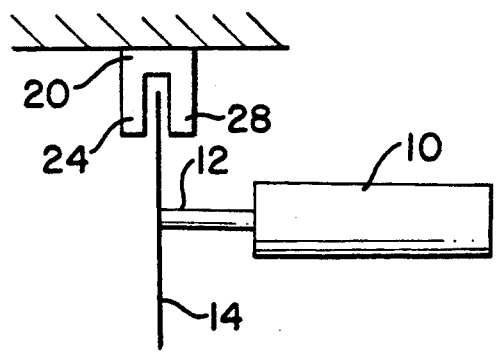
FIG. 2 is a side view of the assembly of FIG. 1.

Referring now to the drawings, FIGS. 1 and 2 illustrates a motor 10 having an output shaft 12 on which is mounted for rotation therewith a reference generator disk 14. The disk 14 is diametrically divided into a first region 16 which is light transmissive and a second region 18 which is opaque. Straddling the disk 14 and fixed against rotation is an optical sensor assembly 20 which has a light emitting diode 22 (FIG. 3) in a first leg 24 and a phototransistor 26 (FIG. 3) in a second leg 28.

Figure 3:
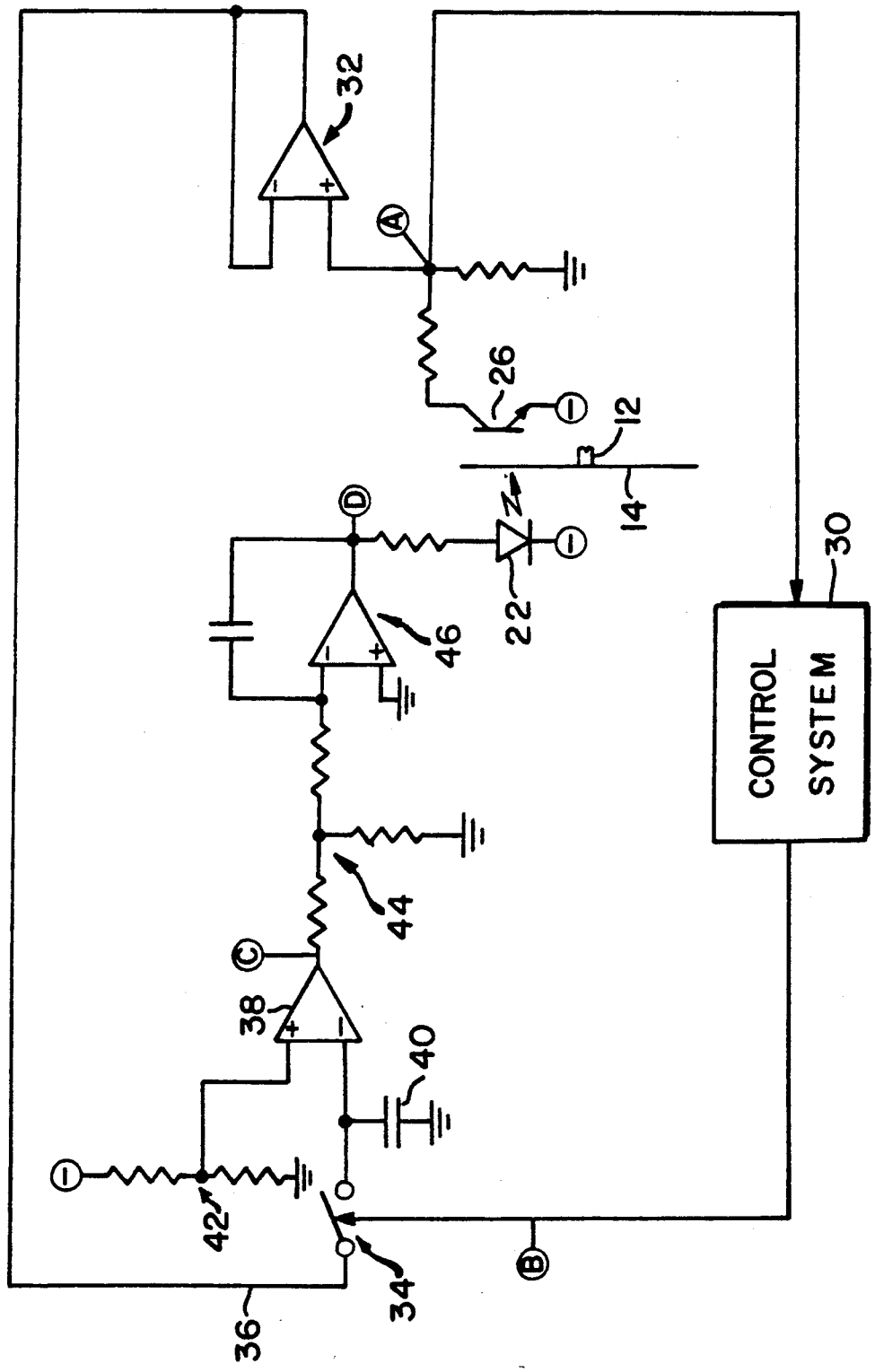
FIG. 3 is a schematic diagram of illustrative circuitry for implementing the present invention.
Figure 4A:
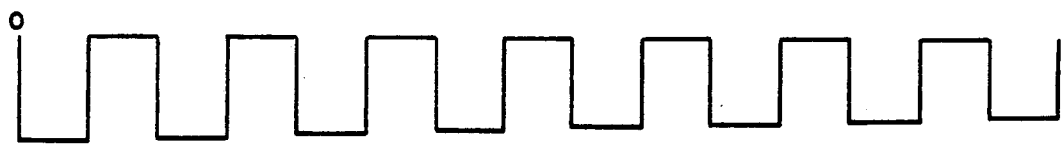
FIGS. 4A-4D are timing charts useful for understanding the present invention, showing the signals appearing at the points A-D, respectively, in the circuit of FIG. 3.

Referring now to FIG. 3, light produced by the light emitting diode 22 passes through the disk 14 and impinges on the phototransistor 26 when the light transmissive region 16 is therebetween. This causes the phototransistor 26 to become conductive, to an extent which depends upon the amount of light impinging thereon, so as to lower the voltage at the point A. When the opaque region 18 of the disk 14 is between the light emitting diode 22 and the phototransistor 26, the phototransistor 26 becomes non-conductive, raising the voltage at the point A. Thus, the voltage at the point A ideally takes the form of a square wave (FIG. 4A). This square wave is utilized by the control system 30 as a reference signal to provide timing for the multi-sensor system. As described above, when the system is subjected to temperature variation, the amplitude of the square wave at the point A will vary. The present invention compensates for such variation, as will be described below.

Figure 4B:
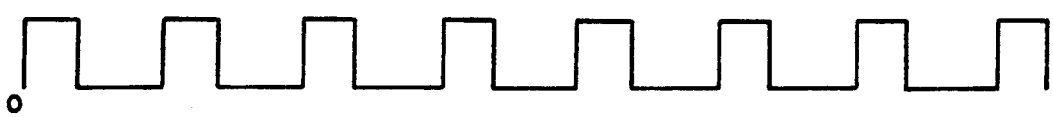

The output of the phototransistor 26 at the point A is applied through the voltage follower 32 to the controllable switch 34. The switch 34 is controlled by the signal on the lead B from the control system 30 and, as shown in FIG. 4B, the switch trigger signal is a square wave signal which is active only during the time that light impinges on the phototransistor 26 and not during the transitions of the signal at the point A. Since the motor 10 operates at a substantially constant known speed, the control system 30 can generate the switch trigger signal on the lead B a preset time after the transition of the signal at the point A and terminate the switch trigger signal prior to the next transition of the signal at the point A.

The switch 34, while shown schematically in FIG. 3, can be any type of controllable switch, such as, for example, an FET switch. When the switch 34 is closed, the signal on the lead 36 is applied as an input to the negative input terminal of the comparator 38. The switch 34 and the capacitor 40 operatively function as a sample and hold circuit so that the comparator 38 only sees the output of the phototransistor 26 during the time that light impinges thereon. The positive terminal input to the comparator 38 is obtained from the voltage divider 42 which provides a reference voltage corresponding to the desired output level of the phototransistor 26.

The output of the comparator 38 passes through an attenuator network 44 to the input of an integrator network 46, the output of which is utilized to control the drive voltage across the light emitting diode 22.

Figure 4C:
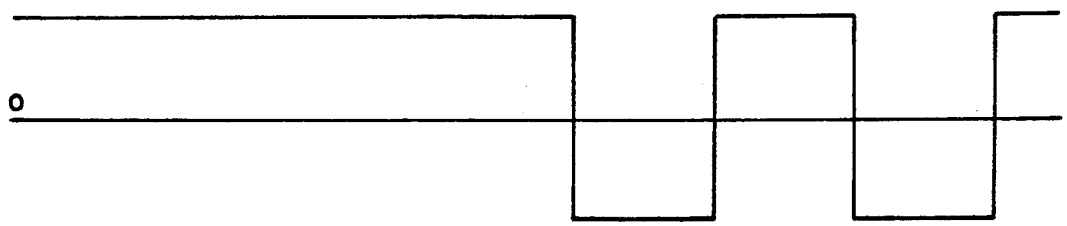
Figure 4D:
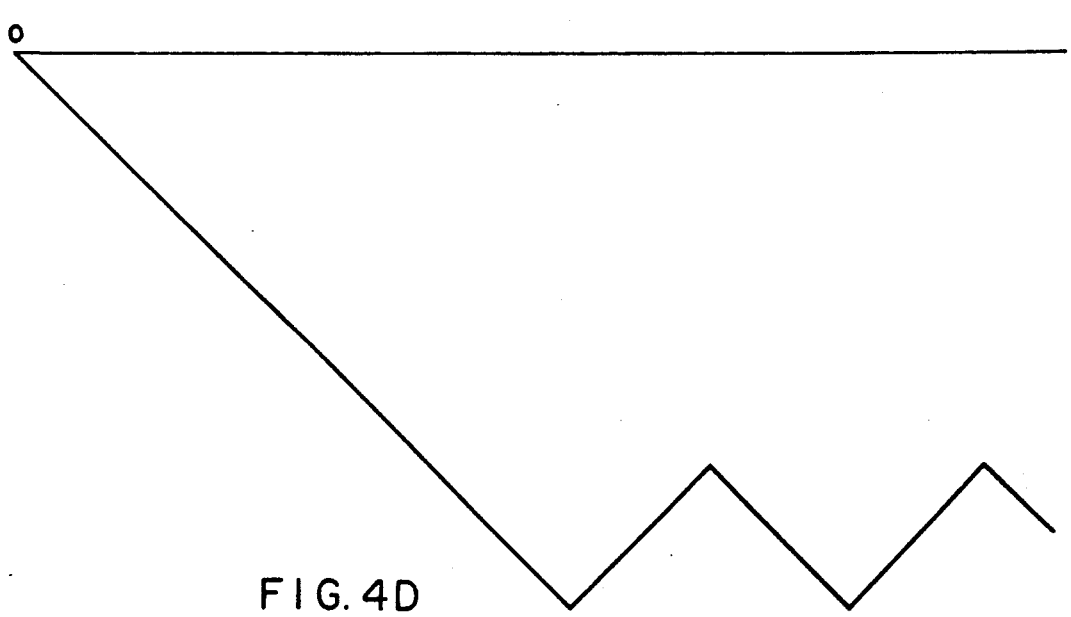

Reference is now made to FIGS. 4A-4D for a description of the operation of the circuit shown in FIG. 3. When the circuit is first turned on, the output of the integrator 46 at the point D is at zero. Therefore, the light emitting diode 22 has the maximum drive voltage applied thereacross and is at its brightest. Accordingly, the amplitude of the output of the photo-transistor 26 at the point A is at its maximum, which is greater than the reference level set by the voltage divider 42, so that the output of the comparator 38 at the point C is positive. This causes the integrator 46 output at the point D to ramp negatively, thereby decreasing the drive voltage across the light emitting diode 22 and dimming the output thereof. When the light emitting diode 22 is sufficiently dim that the amplitude of the signal at the output of the phototransistor 26 is less than the desired level, the output of the comparator 38 changes polarity and the integrator 46 output ramp reverses in slope, as shown in FIGS. 4C and 4D. Thus, a condition of stability is achieved where the output of the phototransistor 26 is maintained substantially at a desired predetermined fixed level. If temperature variations change the characteristics of the light emitting diode 22 and/or the phototransistor 26, the aforedescribed circuitry provides compensation for such changes.

Accordingly, there has been disclosed a compensation arrangement for an opto-electronic reference generator. While an illustrative embodiment of the present invention has been disclosed herein, it will be apparent to those of ordinary skill in the art that various modifications and adaptations to that embodiment are possible and it is only intended that the present invention be limited by the scope of the appended claims.

What is claimed is:

1. In a system having a moving element of alternating light transmissive and opaque areas, a controllable light emitting device situated on a first side of said moving element, a light detecting device situated on a second side of said moving element opposite said light emitting device and adapted to receive light from said light emitting device when a light transmissive area of said moving element is between said devices, said light detecting device providing a first signal representative of the amount of light impinging thereon, and means utilizing said first signal for providing a reference signal indicative of the position of said moving element relative to said light emitting and detecting devices, an arrangement for maintaining the level of said first signal substantially at a predetermined fixed level when light from said light emitting device passes through a light transmissive area of said moving element and impinges on said light detecting device, the arrangement comprising:

means for providing a reference voltage corresponding to said predetermined fixed level;
means for providing a second signal corresponding to said first signal where the correspondence between said first and second signals is the same as the correspondence between said fixed level and said reference voltage;
means for comparing said second signal with said reference voltage and providing a comparison signal representative of the difference therebetween; and
means for utilizing said comparison signal to provide a variable drive voltage across said light emitting device so as to maintain the level of said first signal substantially at said predetermined fixed level when light from said light emitting device passes through a light transmissive area of said moving element and impinges on said light detecting device, the light produced by said light emitting device being related to the magnitude of said drive voltage.

2. The arrangement according to claim 1 wherein said comparing means includes sample and hold means operating in synchronism with said reference signal and coupled to receive said second signal for insuring that the comparing of said second signal with said reference voltage uses the level of said second signal only when a light transmissive area of said moving element is between said light emitting and detecting devices.

3. The arrangement according to claim 1 wherein said light emitting device comprises a light emitting diode having first and second terminals, and said utilizing means includes:

means for coupling said first terminal to a fixed supply voltage; and
integrating means coupled between said comparing means and said second terminal for varying the drive voltage across said light emitting diode in accordance with said comparison signal.

4. The arrangement according to claim 3 wherein said comparing means includes sample and hold means operating in synchronism with said reference signal and coupled to receive said second signal for insuring that the comparing of said second signal with said reference voltage uses the level of said second signal only when a light transmissive area of said moving element is between said light emitting and detecting devices.

5. The arrangement according to claim 4 wherein said comparing means further includes a comparator having first and second inputs and an output, said reference voltage being coupled to said first input and said sample and hold means being coupled to said second input, said output being coupled to said integrating means.

6. The arrangement according to claim 5 further including an attenuator coupled between said comparator output and said integrating means.

* * * * *